Figure 5:
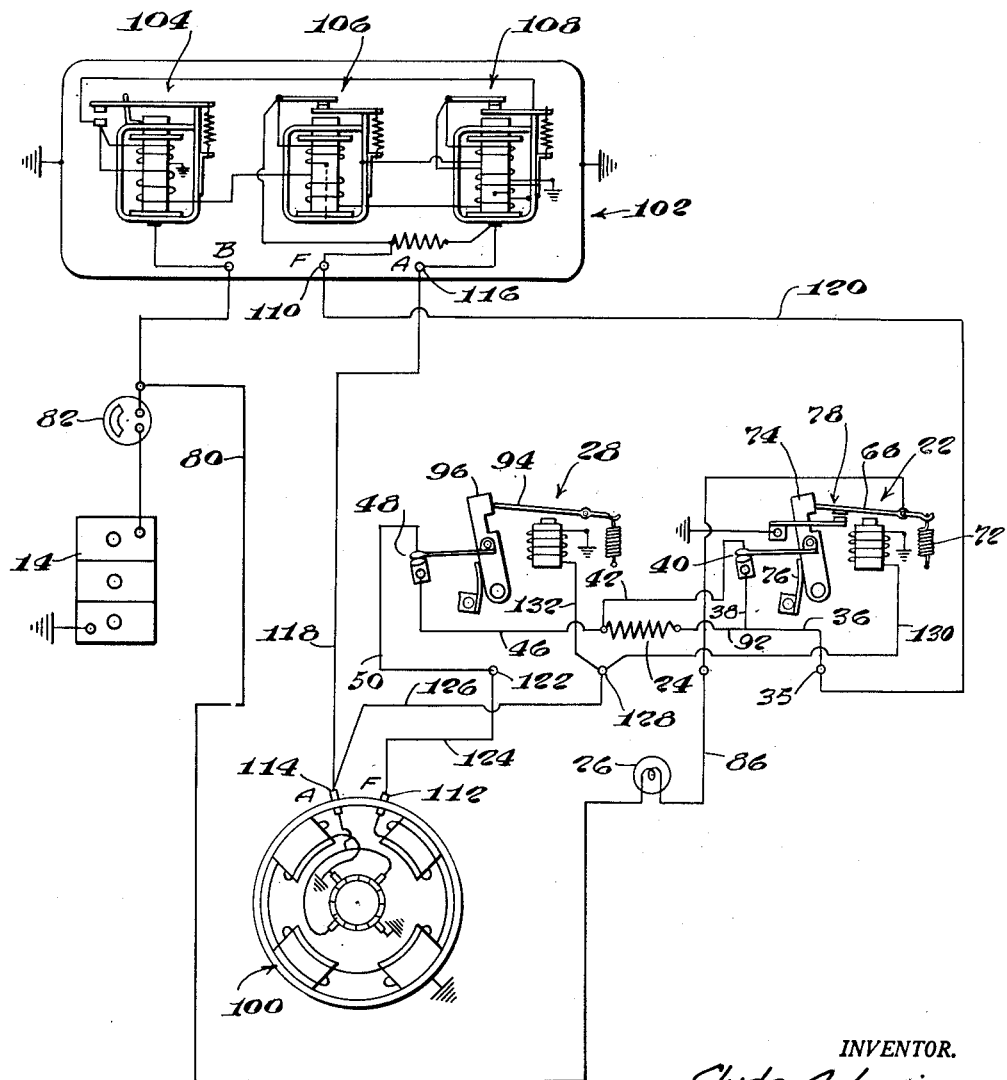

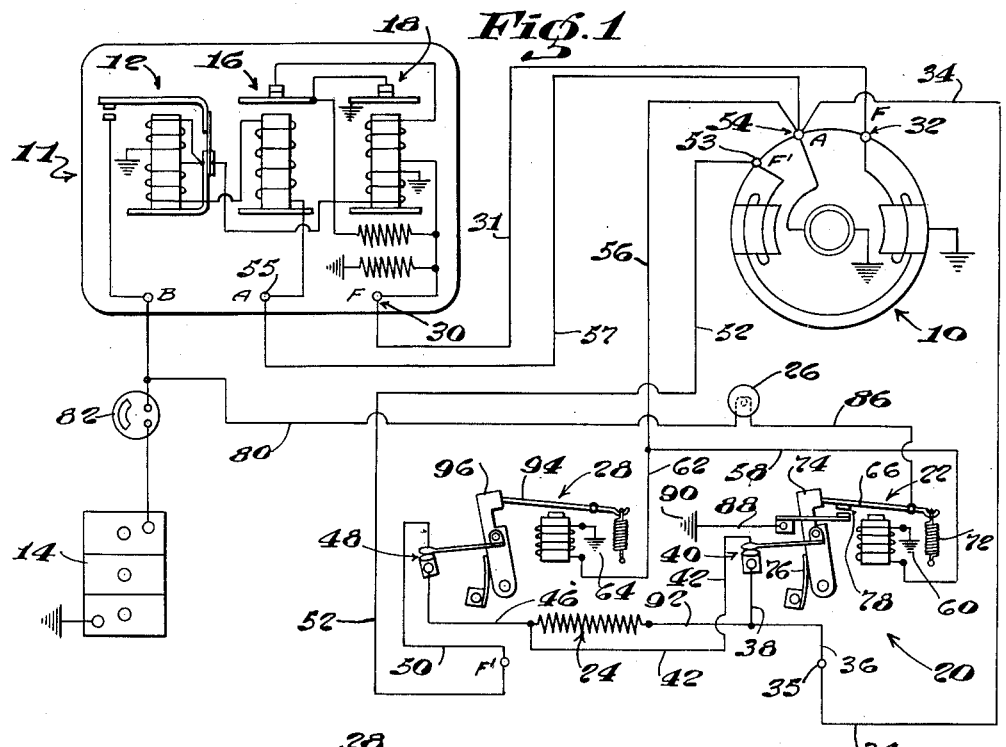

Aug. 12, 1952  C. A. LUCIEN  2,607,026
GENERATOR CONTROL FOR BATTERY CHARGING SYSTEMS
Filed Aug. 9, 1947  2 SHEETS—SHEET 2

INVENTOR.
Clyde A. Lucien
BY
J. Stanley Churchill
ATTORNEY

Patented Aug. 12, 1952

2,607,026

UNITED STATES PATENT OFFICE 2,607,026

GENERATOR CONTROL FOR BATTERY CHARGING SYSTEMS

Clyde A. Lucien, Lynn, Mass.

Application August 9, 1947, Serial No. 767,697

2 Claims. (Cl. 320—24)

This invention relates to generator controls.

This invention has for an object to provide a novel and improved control for generators of the type employed on motor driven vehicles and which may be employed as an auxiliary or safety control for protecting the electrical system in the event that the conventional generator controls fail to function properly.

With this general object in view and such others as may hereinafter appear, the invention consists in the generator control system and in the various structures, arrangements and combinations of parts hereinafter described and particularly defined in the claims at the end of this specification.

In the drawings illustrating the preferred embodiment of the invention, Fig. 1 is a wiring diagram showing the present auxiliary control system embodied in a circuit for a standard type of generator having the conventional current and voltage regulator controls for a generator of the type having an externally grounded field circuit; Fig. 2 is a plan view of a preferred form of the present auxiliary control unit shown with the cover removed; Figs. 3 and 4 are side and end elevations respectively of the control unit shown in Fig. 2, the cover being shown in cross section in Fig. 3; and Fig. 5 is a wiring diagram showing the present auxiliary control system embodied in a circuit for a heavy duty generator having an armature to field connection.

In general, the present invention contemplates the provision of an auxiliary or safety control circuit adapted to be employed in a current and voltage regulated generator, the present safety control being arranged to protect the system from damage in the event that the conventional voltage regulator or equivalent control fails to regulate the generator output within the voltage range for which the system is designed to operate.

Some of the more common faults and conditions to which the prior current and voltage regulated generator control systems are subject include: fusing together of the voltage regulator contact points; improper setting; grounded generator field circuit; poor ground connection at regulator; loose battery terminal connection or any poor connections between generator and battery; high temperature conditions or other defects. In the event of failure of the prior control system for any of the above reasons the generator output is liable to be increased beyond the limit for which the unit is designed thus rendering the battery and all the electrical units in the circuit subject to injury from the accompanying high voltage.

In accordance with the present invention, the safety control system is adapted to be connected in the generator field circuit and is arranged to protect the electrical system from damage in the event that a high voltage condition exists, due to failure of the voltage regulator, by automatically inserting additional resistance into the field circuit thus reducing the generator output voltage, and, by automatically locking and maintaining the additional resistance in the field circuit to permit continuance of operation while maintaining the protection of the system until the fault or other condition can be serviced and corrected. Provision is also preferably made for simultaneously closing a switch to light a warning lamp visible to the operator, or other signal, to indicate that the system is not functioning properly and that correction is required. Provision is also preferably made in the present safety control system for opening the circuit entirely in the event that a still greater and dangerously excessive voltage should occur thus protecting the system from damage, the circuit being locked and retained in its open position until the system has been tested and serviced to correct and repair the faulty condition.

Referring now to the drawings and particularly to Fig. 1, 10 represents a generator herein illustrated as comprising a generator of the conventional shunt wound two brush type having an externally grounded field circuit and having a three unit regulator indicated generally at 11 comprising a cut out relay 12 arranged to complete the circuit between the generator and the battery 14 when the generator voltage builds up to a desired value and vibrating current and voltage regulators 16, 18 respectively which operate independently to normally maintain the output and voltage within predetermined limits by inserting and removing a resistance in the generator field thus normally automatically adjusting the generator output to the desired value as required by the connected electrical load and condition of charge of the battery.

The present safety or high voltage control unit, indicated generally at 20, is herein illustrated as connected in the field circuit and as auxiliary to the conventional regulator 11, and, in general includes a self-locking relay coil 22 adapted to insert a resistance 24 into the field circuit and to simultaneously effect lighting of a lamp 26 or other warning signal upon operation of the relay as effected by a higher than normal voltage condition, and, a second self-locking relay coil 28 adapted to effect opening of the circuit upon detection of a still higher excessive generator output and accompanying higher voltage in the system.

The present safety control system 20 is designed to be ineffective during normal operation of the generator 10 and regulator 11, being connected in a circuit between the armature terminal 54 and a field winding terminal 53, during normal operation. As illustrated in Fig. 1 the preferred circuit for a generator having a ground to field connection includes a lead 34 from the armature terminal 54 to a terminal 35, leads 36, 38 through switch contacts 40, leads 42, 46 through a second set of switch contacts 48 and thence through leads 50, 52 to the field winding terminal 53. The field terminal 30 of the regulator unit 11 is connected in the usual manner by a lead 31 to the field terminal 32, and the armature terminal 55 is likewise connected by a lead 57 to the armature terminal 54 of the generator.

The relay coil 22 is also connected to the armature terminal 54 of the generator through leads 56, 58, the other end of the coil winding being grounded at 60, and, the second relay coil 28 is similarly connected to the generator armature terminal 54 through leads 56, 62, the coil being grounded at 64, as shown.

As diagrammatically illustrated in Fig. 1, and as shown in detail in Figs. 2, 3 and 4, the armature 66 of the relay coil 22 comprises a flat metal member attached to the frame 68 by a flexible hinge 70 and is normally rocked upwardly away from the core of the relay coil by a spring 72. Cooperating with the armature 66 is a pivotally mounted latch member 74 urged in a clockwise or latching direction by a spring 76 and normally bearing against the adjacent edge of the armature 66 when the latter is in its upraised or inactive position. The pivotally mounted latch 74 carries one of the switch contact members 40 and when in its unlatched position is arranged to maintain the switch contacts closed, as shown in Fig. 1. The armature 66 is further provided with one of a pair of normally open switch contacts 78 forming a part of the circuit to the warning lamp 26 and the circuit includes a lead 80 from the ammeter 82 to the lamp, and a lead 86 from the lamp to the armature contact 78, the stationary contact of the switch being grounded through a lead 88 to a ground terminal indicated at 90. While the warning lamp 26 is herein shown as mounted on the frame of the auxiliary control unit in Fig. 3, it will be understood that in practice when used in an automobile or an airplane for example, the warning light or other signal may be located on the dash board, instrument panel or other convenient location in view of the operator.

From the description thus far it will be seen that in the event that the output voltage of the generator exceeds a predetermined maximum value, the magnetism induced in the relay windings is sufficient to overcome the armature spring tension and to pull the armature down toward the core thus closing the warning circuit at switch contacts 78 to light the warning lamp 26; permitting the latch arm 74 to be rocked clockwise to latch and lock the armature in its pulled down position; and opening the switch contacts 40. Upon opening of the contacts 40 the current is shunted through a lead 92 and through the resistance 24 to thus effectively reduce the generator output to within safe limits and simultaneously therewith warning the operator that the regulator is not functioning normally. It will be understood that voltage is applied to the coil winding at all times, the coil being operated to pull the armature down only when the voltage exceeds a predetermined value. Assuming, for example, that the normal maximum voltage is 7.5 volts, the relay coil 22 may be arranged to operate when the voltage exceeds this value by one volt. Thus, the system is maintained to permit continuance of operation while providing protection for the system until the faulty condition of the generator and its conventional control system have been tested and restored to normal operation whereupon the latch arm 74 may be manually reset to again close the field circuit at contacts 40 and to open the warning lamp circuit at contacts 78. The value of the resistance 24 may be determined in each case with regard to the particular generating system to which it is applied.

In the event that the generator output voltage rises still further so as to be likely to cause excessive damage to the electrical units, the second relay coil 28 is caused to become operative to pull its armature 94 down toward the core, the armature 94 being similar in construction and operation to the armature 66. A second pivotally mounted latch member 96 is arranged to cooperate with the end of the armature 94 to lock the same in its pulled down position. The latch member 96 carries one of the switch contacts 48 and, in operation, when in its unlatched position is arranged to maintain the switch contacts 48 closed. Upon operation of the relay coil 28 and consequent pivotal movement of the spring pressed latch 96, the contacts 48 are separated to open the field circuit thus rendering the entire system inoperative until the faulty electrical units can be serviced and restored to normal operation, whereupon the latch arm 96 may be reset to again close the field circuit at contacts 48 for normal operation.

From the above description of the safety control unit 20 as embodied in a generator of the type having an externally grounded field circuit, illustrated in Fig. 1, it will be observed that the auxiliary control system will become operative to control the output of the generator by automatically inserting the resistance 24 in the field winding of the generator in the event that any fault occurs which renders the conventional regulator unit 11 inoperative to control the generator. Furthermore, since the present safety control unit is connected to the field coil winding opposite to that connected to the field coil terminal 32, it will be observed that should any fault occur in the generator such as a grounding at the field coil terminal or in the lead between the field coil and the terminal 32, or a grounding of the lead 31 to the regulator unit 11, which would increase the voltage output of the generator, the present safety control device will be operative to insert the resistance 24 into the field circuit to maintain the voltage within safe limits, or, in the event that a dangerously excessive voltage occurs, the safety control system will be operative to open the circuit entirely to thus prevent damage to the electrical units.

The description thus far relates particularly to an embodiment of an auxiliary control unit as employed with or incorporated in a conventional generator and regulator unit of the type most generally used for the ordinary passenger motor vehicles. Referring now to Fig. 5, the present control unit 20 is therein illustrated as embodied in a conventional heavy duty type of generator 100 having a standard regulator 102, this type of generator being most commonly used for large commercial vehicles such as trucks and busses, industrial equipment, airplanes and marine engines. Such heavy duty generators may be of the four pole shunt wound type having an armature to field connection and the regulator unit 102 may include a cut-out relay 104, current regulator 106, and voltage regulator 108. As herein shown, the auxiliary control unit 20 is preferably connected in the field circuit between the field terminal 110 of the conventional regulator unit 102 and the field terminal 112 of the generator, the armature terminal 114 of the generator being directly connected to the armature terminal 116 of the regulator 102 by a lead 118.

The auxiliary control unit 20 for the heavy duty type of generator is similar in construction and mode of operation to the control unit previously described in connection with the embodiment shown in Fig. 1, corresponding parts being indicated by the same numerals, and, as shown in Fig. 5, the preferred circuit for connecting the auxiliary control unit in a generator and regulator unit having an armature to field connection includes a lead 120 from the field terminal 110 to the terminal 35. During normal operation the circuit is continued from the terminal 35 through leads 36, 38, switch contacts 40, leads 42, 46 through a second set of switch contacts 48 and thence through lead 50 to a terminal 122. A lead 124 connects the terminal 122 to the generator field terminal 112.

In the event that the relay coil 22 is subjected to a greater than normal voltage, the circuit will be opened at switch contacts 40 and the current will be shunted through a lead 92 and the resistance 24 to thus reduce the effective voltage thus safeguarding the electrical equipment while permitting continuance of operation. In the event that a still greater voltage occurs, the switch contacts 48 will be opened to discontinue the circuit entirely. The relay coils 22, 28 are connected to the armature terminal 114 through a lead 126 to a terminal 128 and thence through leads 130, 132 to the coils 22, 28 respectively, the other ends of the coils being grounded as indicated in Fig. 5. The warning lamp 26 or other signal is arranged to be actuated upon operation of the relay coil 22 through closing of the circuit at contacts 78 in a manner similar to that above described.

From the above description it will be observed that the present generator control unit provides a safety control to protect the generator and associated electrical units in the event of a failure of the usual controls such as to cause excessive voltage to exist in the system, the present control unit permitting continuance of operation while maintaining protection until the system can be properly serviced, and also being capable of discontinuing the circuit entirely in the event that a higher and unduly excessive voltage output occurs.

It will be further observed that the present control unit may be employed with advantage as a safety control or high voltage cut-off for any type of electrical generating system whether current and voltage regulated or not.

While the preferred embodiment of the invention has been herein illustrated and described, it will be understood that the invention may be embodied in other forms within the scope of the following claims.

Having thus described the invention, what is claimed is:

1. In an electrical system comprising a battery, a load circuit and a generator connected therewith for maintaining a charge on said battery and for assuming the load when voltage above a predetermined value is generated thereby, said generator having a shunt field and a primary regulating means connected in series therewith, said primary regulating means including a resistance and means responsive to the voltage developed by said generator for inserting said resistance in series with the generator field in response to generator output voltage above said predetermined value and operative during normal operation of the system, and secondary control means for said generator comprising a protective device operative when an abnormal condition occurs in the system and including a second resistance and a relay switch responsive to generator output voltage in excess of a second higher predetermined value for inserting said second resistance in series with said generator field and said primary regulating means, said relay switch having an armature, said secondary regulating means including a pivotally mounted resettable latch arm cooperating with said armature, one contact of said switch being carried by and movable with said latch arm and normally held in its switch closing position by said armature to effect by-passing of said second resistance, and resilient means for retaining said latch arm in its switch opening position upon operation of said relay to maintain said second resistance in series with said field circuit during subsequent operation until the latch arm may be manually reset after the cause of said higher predetermined excessive voltage is removed.

2. In an electrical system comprising a battery, a load circuit and a generator connected therewith for maintaining a charge on said battery and for assuming the load when voltage above a predetermined value is generated thereby, said generator having a shunt field and a primary regulating means connected in series therewith, said primary regulating means including a resistance and means responsive to the voltage developed by said generator for inserting said resistance in series with the generator field in response to generator output voltage above said predetermined value and operative during normal operation of the system, and secondary control means for said generator comprising a protective device operative when an abnormal condition occurs in the system and including a second resistance and a relay switch responsive to generator output voltage in excess of a second higher predetermined value for inserting said second resistance in series with said generator field and said primary regulating means, said relay switch having an armature, said secondary regulating means including a pivotally mounted resettable latch arm cooperating with said armature, one contact of said switch being carried by and movable with said latch and normally held in its switch closing position by said armature to effect by-passing of said second resistance, and means for retaining said latch arm in its switch opening position upon operation of said relay to maintain said second resistance in series with said field circuit during subsequent operation until the latch arm may be manually reset after the cause of said higher predetermined excessive voltage is removed, and a second relay switch having an armature and responsive to generator output voltage in excess of a still higher predetermined value for opening said field circuit, said second relay switch including a second pivotally mounted resettable latch arm cooperating with said second armature one contact of said second switch being carried by and movable with said second latch arm and normally held in its switch closing position by said second armature, and resilient means for retaining said second arm in its switch opening position upon operation of said second relay until said second latch arm may be manually reset after the cause of said still higher predetermined and unduly excessive voltage is removed.

CLYDE A. LUCIEN.

REFERENCES CITED

The following references are of record in the file of this patent:

UNITED STATES PATENTS

| Number | Name | Date |
|---|---|---|
| 969,542 | Krotz | Sept. 6, 1910 |
| 1,131,176 | Turbayne | Mar. 9, 1916 |
| 1,238,145 | Honold et al. | Aug. 28, 1917 |
| 1,246,853 | Bliss | Nov. 20, 1917 |
| 1,535,956 | Springer | Apr. 28, 1925 |
| 1,816,713 | Burnham | July 28, 1931 |
| 1,906,817 | Seeley | May 2, 1933 |
| 2,019,430 | McNeil | Oct. 29, 1935 |
| 2,099,640 | Woodbridge | Nov. 16, 1937 |

FOREIGN PATENTS

| Number | Country | Date |
|---|---|---|
| 403,827 | Germany | Oct. 7, 1924 |
| 570,112 | France | Jan. 12, 1924 |